June 21, 1932.                B. L. QUARNSTROM              1,863,874
                                TUBULAR CONTROL
                              Filed Feb. 15, 1930
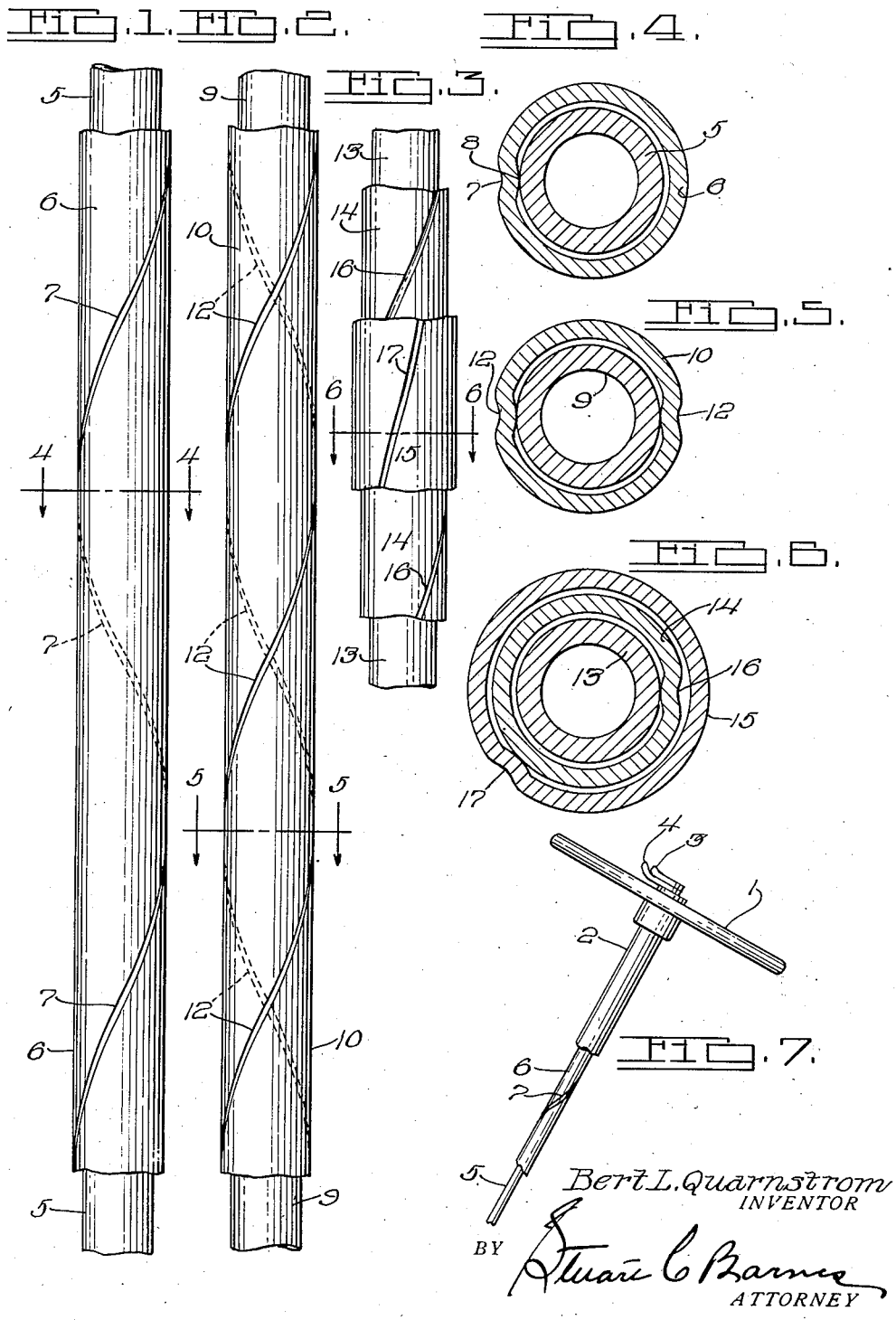

Patented June 21, 1932

1,863,874

UNITED STATES PATENT OFFICE

BERT L. QUARNSTROM, OF GROSSE POINTE PARK, MICHIGAN, ASSIGNOR TO BUNDY TUBING COMPANY, OF DETROIT, MICHIGAN, A CORPORATION OF MICHIGAN

TUBULAR CONTROL

Application filed February 15, 1930. Serial No. 428,844.

This invention relates to tubular control.

It is old in the art to utilize two or more tubes one within the other for control purposes; an example of this is the dual tubular control for the spark and gas which is positioned within the steering column of the automobile. If the surfaces of the tubes contact completely, the friction will be too great to permit proper slippage between the tubes. Yet in such tubular control it is desirable to have a certain amount of friction to prevent too easy a relative movement between the tubes. Hence, it is the object of this invention, in its broad aspect, to produce a tubular control in which the bearing contact between the tubular members comprises a curvilinear raised portion. Specifically this bearing contact comprises a curvilinear groove formed in one of the said tubular members. When the tubular control consists of three or more tubes which are enclosed one within the other, then the adjacent tubes can be provided with curvilinear bearing contacts of different pitches which prevents any interlocking of the tubes.

In the drawing:

Fig. 1 shows a dual tubular control with the outer tube having a curvilinear groove.

Fig. 2 likewise shows a dual tubular control with the outer tube having two curvilinear grooves.

Fig. 3 shows a tri-tubular control with the two outer tubes having curvilinear grooves of different pitches.

Fig. 4 is a section along the line 4—4 of Fig. 1.

Fig. 5 is a section along the line 5—5 of Fig. 2.

Fig. 6 is a section along the line 6—6 of Fig. 3.

Fig. 7 is a fragmentary view of a steering wheel and steering column showing the tubular control within the steering column.

Referring more particularly to the drawing, particularly Fig. 7 in which I have shown my tubular control specifically applied to the steering column of an automobile, but it is understood that this tubular control may be used in numerous other places, the steering wheel may be referenced 1 and the steering column 2. Pivotally mounted on the steering column 2 is the spark lever 3 and the gas control lever 4 which are respectively connected to the inner tubular control member 5 and outer tubular control member 6. Hence, when the driver moves either the spark lever 3 or gas control lever 4, the control tubes 5 and 6 rotate one within the other. Figs. 1 and 4 show the tubular members 5 and 6 in detail. It will be seen that the outer tube 6 is provided with a single curvilinear groove 7 which is preferably helical and provides a helical bearing surface 8 between the inner tube 5 and the outer tube 6. This helical groove at all times maintains the inner and outer tube in concentric relation and at the same time permits the inner and outer tubes 5 and 6 to rotate relative to each other with the desired amount of friction as in the case of the spark and gas control levers shown which should turn sufficiently easy and yet with sufficient friction that they will remain in whatever position they are placed.

In Fig. 2 I have shown a modified form of my tubular control. In this case the inner tubular member 9 is enclosed by the outer tubular member 10 which has the two helical grooves 11 and 12 respectively.

In Fig. 3 I have shown the tri-tubular control which consists of the inner tube 13, the middle tube 14, and the outer tube 15. The inner tube 13 has a smooth surface and is not grooved. The middle tube 14 is provided with the helical groove 16 and the outer tube is provided with the helical groove 17. To prevent the groove 17 from registering with the groove 16 and thereby cause the tubes 14 and 15 to become eccentric and interlocked, the grooves 16 and 17 have different pitches as brought out nicely in Fig. 3.

It is understood that any number of helical grooves may be used in this tubular control. The number of helical grooves will be determined by the frictional resistance required between the tubes when they are rotated one within the other. In other words, the number of grooves placed in each of the tubes will vary according to the working requirements of the various applications of this tubular control.

From the above description it is evident that there is here produced a tubular control consisting of a plurality of telescoped tubes which are arranged for relative movement and which are provided with curvilinear engaging bearing surfaces such as to maintain the tubes concentric at all times and which bearing surfaces can be varied in pitch to prevent the interengagement of one bearing surface with another and consequent interlocking of the tubular members.

It is also obvious that if the outer diameter of the inner tube were substantially equal to the inner diameter of the outer tube and neither tube were provided with a raised bearing portion, that the friction would be too great to permit sufficiently easy slippage between the inner and outer tube. Likewise, if the outer diameter of the inner tube were sufficiently less than the inner diameter of the outer tube to permit a sloppy fit of the inner tube within the outer tube, then the inner tube would rattle within the outer tube. Hence, it will be seen that the curvilinear raised bearing portion or helical groove serves also as an anti-rattler.

What I claim is:

1. A tubular control comprising in combination a plurality of tubes enclosed one within the other and adapted for relative rotative movement, at least two of said tubes each being provided with a curvilinear raised portion which serves as a spacer between the said tubular members, the curvilinear raised portion of one tube having a different pitch from that of the other.

2. A tubular control comprising in combination a plurality of tubes enclosed one within the other, and adapted for relative rotation, at least two of said tubes each being provided with a helical raised portion which serves as a spacer between the said tubular members, the helical raised portion of one tube having a different pitch from that of the other.

3. A tubular control comprising in combination a plurality of tubes enclosed one within the other, at least two of said tubes each being provided with a curvilinear groove forming a projection which serves as a spacer between the said tubular members, the curvilinear groove of the one tube having a different pitch from that of the other.

4. A tubular control comprising in combination a plurality of tubes enclosed one within the other, at least two of said tubes each being provided with a helical groove forming a projection which serves as a spacer between the said tubular members, the helical groove of one tube having a different pitch from that of the other.

5. A tubular control comprising in combination a plurality of telescoped tubular members arranged for relative rotation, means for rotating at least one of said tubes, one of said members having a curvilinear groove which serves as a bearing surface, another of said tubular members having a curvilinear groove of a pitch different than the curvilinear groove of the aforesaid tube whereby the said tubes may be rotated one relative to the other without interlocking.

6. A tubular control comprising in combination a plurality of telescoped tubular members arranged for relative rotation, means for rotating at least one of said tubes, one of said members having a helical groove which serves as a bearing surface, another of said tubular members having a helical groove of a pitch different than the helical groove of the aforesaid tube whereby the said tubes may be rotated one relative to the other without interlocking.

7. A tubular control for the steering column of an automotive vehicle comprising in combination a plurality of tubes consisting of an inner tube and outer tubes arranged for relative rotative movement, the inner diameter of each outer tube being greater than the outer diameter of the inner tube, at least two of said tubes each having a curvilinear groove forming a projection which serves as a bearing and anti-rattler for the tubular member when rotated, the curvilinear groove of the one tube having a different pitch from that of the other.

In testimony whereof I affix my signature.

BERT L. QUARNSTROM.